March 4, 1958 J. G. KREER, JR 2,825,762
MAGNETICALLY LOADED ELECTRICAL CONDUCTORS
Filed June 29, 1951 2 Sheets-Sheet 1
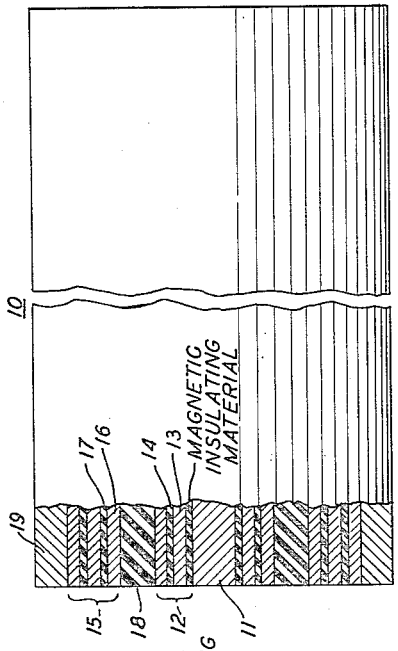
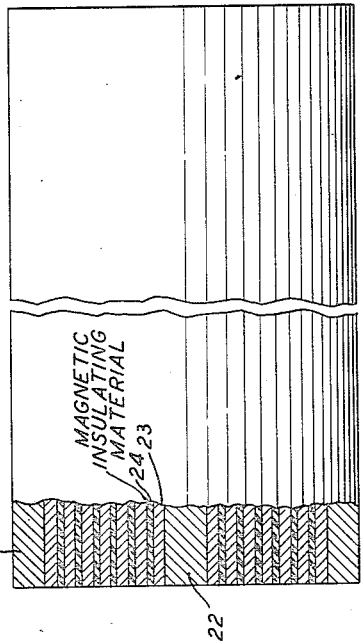
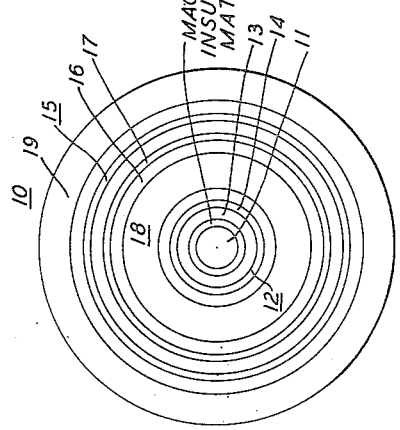
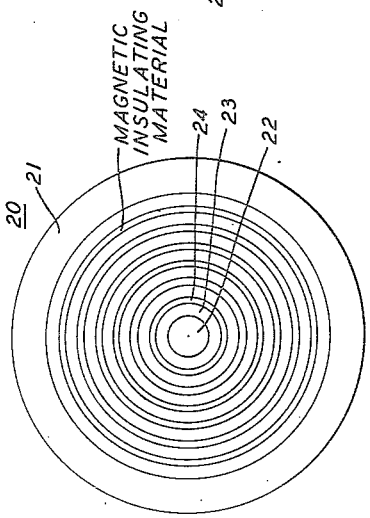
INVENTOR
J. G. KREER, JR.
BY
ATTORNEY March 4, 1958  J. G. KREER, JR  2,825,762
MAGNETICALLY LOADED ELECTRICAL CONDUCTORS
Filed June 29, 1951  2 Sheets-Sheet 2

INVENTOR
J. G. KREER, JR.
BY
Hugh S. Wertz
ATTORNEY

United States Patent Office 2,825,762
Patented Mar. 4, 1958

2,825,762

MAGNETICALLY LOADED ELECTRICAL CONDUCTORS

John G. Kreer, Jr., Bloomfield, N. J., assignor to Bell Telephone Laboratories, Incorporated, New York, N. Y., a corporation of New York Application June 29, 1951, Serial No. 234,360

4 Claims. (Cl. 178—45)

This invention relates to electrical conductors and more specifically to composite conductors formed of a multiplicity of conducting portions insulated from each other.

It is an object of this invention to improve the current distribution in conductors of the type comprising a large number of insulated conducting portions, and particularly to effect such improvement by magnetic loading.

In a copending application of A. M. Clogston, Serial No. 214,393, filed March 7, 1951, and which issued on October 30, 1956, as Patent 2,769,148, there are disclosed a number of composite conductors, each of which comprises a multiplicity of insulated conducting elements of such number, dimensions, and disposition relative to each other and to the orientation of the electromagnetic wave being propagated therein as to achieve a more favorable distribution of current and field within the conducting material. In one specific embodiment disclosed in Figs. 7A and 7B of the Clogston application, two coaxially arranged composite conductors are separated by a dielectric material, each of the composite conductors comprising a multiplicity of thin metal laminations insulated from one another by layers of insulating material, the smallest thickness of each of the laminations being in the direction perpendicular to both the direction of wave propagation and the magnetic vector. Each metal lamination is many times (for example 10, 100 or even 1000 times) smaller than the factor $\delta$ which is called one skin thickness or one skin depth. The distance $\delta$ which hereinafter will sometimes be referred to as the classical skin depth is given by the expression $$\sqrt{\frac{1}{\pi f \mu \sigma}} \quad (1)$$

where $\delta$ is expressed in meters, $f$ is the frequency in cycles per second, $\mu$ is the permeability of the metal in henries per meter and $\sigma$ is the conductivity in mhos per meter. The factor $\delta$ measures the distance in which the current and field penetrating into a slab of the metal many times $\delta$ in thickness will decrease by one neper; i. e., their amplitude will become equal to $$\frac{1}{e} = 0.3679 \cdots$$

times their amplitude at the surface of the slab.

It is pointed out in the above-identified copending application that when a conductor has such a laminated structure, a wave propagating along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. Assuming non-magnetic materials, the critical velocity for the type of structure just described is determined by the thickness of the metal and insulating laminae and the dielectric constant of the insulation between the laminae in the composite conductors. In the absence of magnetic materials, the critical velocity can be maintained by making the dielectric constant of the main dielectric, that is, the dielectric material between the two composite conductors, equal to $$\epsilon_1 = \epsilon_2 \left( 1 + \frac{W}{t} \right) \quad (2)$$

where $\epsilon_1$ is the dielectric constant of the main dielectric element between the two composite conductors in farads per meter, $\epsilon_2$ is the dielectric constant of the insulating material between the conducting laminae in farads per meter, $W$ is the thickness of one of the metal laminae in meters, and $t$ is the thickness of an insulating lamina in meters. The insulating laminae are also made very thin, and with sufficiently thin laminae an optimum relative thickness for certain structures of this general type is that in which each insulating lamina is one-half the thickness of a metal lamina.

The present invention relates to improvements in composite structures of the type just described and in other related structures, such as, for example, the composite conductors in Figs. 17A and 18A of the above-identified copending application and also many others described in that application.

In accordance with the present invention, structures are provided comprising composite conductors of the type above described except that the composite conductor includes magnetic insulating elements in place of the corresponding non-magnetic insulating elements of the earlier structures. A magnetic insulating element is an electrical insulator which has magnetic properties. If the conducting elements in these composite conductors have transverse dimensions small compared to their appropriate (classical) skin depth as defined by Equation 1, there will again be critical velocities at which the waves penetrate deeply into the stacks with the same advantages as before. The particular advantage of including the magnetic elements is that they raise the intrinsic impedance of the stack. Thus if the stack fills all or a substantial portion of the region through which the wave is traveling the impedance of the system will be increased and the losses reduced.

In one specific illustrative embodiment of the present invention, a composite conductor is provided comprising two laminated concentric conductors separated by a main insulating member which may or may not be magnetic, each of the composite conductors consisting of a multiplicity of laminations of conducting material separated by laminations of magnetic insulating material. In a copending application of J. G. Kreer, Jr., Serial No. 234,358, filed June 29, 1951, there are disclosed various arrangements having magnetic material in or for the main insulating member. In another embodiment all of the space between a coaxially arranged outer sheath and an inner core is filled with laminations of conducting material spaced from one another by laminations of magnetic insulating material. In still another embodiment, the space between a central core and an outer sheath is filled with a multiplicity of filaments of conducting material spaced from one another by magnetic insulating material. Various modifications of these typical embodiments also constitute a part of the present invention.

The invention will be more readily understood by referring to the following description taken in connection with the accompanying drawings forming a part thereof, in which:

Fig. 1 is an end view of a coaxial composite conductor in accordance with the invention, the outer conductor comprising a multiplicity of laminations of conducting material separated by laminations of magnetic insulating material and the inner conductor being similar in this respect to the outer conductor, the space between these two conductors being filled with an insulating member which may or may not be magnetic;

Fig. 2 is a longitudinal view, with portions broken away, of the composite conductor of Fig. 1;

Fig. 3 is an end view of another form of coaxial conductor in accordance with the invention, in which all of the space between an outer sheath and an inner core is filled with laminations of conducting material spaced from one another by laminations of magnetic insulating material;

Fig. 4 is a longitudinal view, with portions broken away, of the arrangement of Fig. 3;

Figure 5:
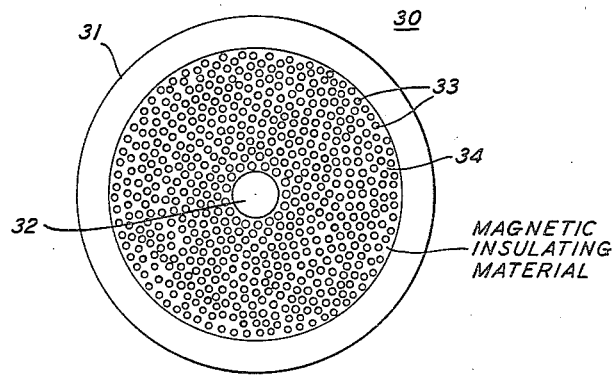
Fig. 5 is an end view of another embodiment of the invention in which the space between a central core and an outer sheath is filled with a multiplicity of filaments of conducting material spaced from one another by magnetic insulating material.

Referring more particularly to the drawings, Figs. 1 and 2 show, by way of example, a conductor 10 in accordance with the invention, Fig. 1 being an end view and Fig. 2 being a longitudinal view. The conductor 10 comprises a central core 11 (which may be either of metal or dielectric material), an inner conductor stack 12 formed of many laminations of conducting material 13 spaced by laminations of magnetic insulating material 14, an outer conductor stack 15 formed of a multiplicity of laminations of conducting material 16 spaced by laminations of magnetic insulating material 17 and separated from the inner conductor 12 by an insulating member 18 which may be magnetic or non-magnetic, and an outer sheath 19 of metal or other suitable shielding material. Analogous to the disclosure in the above-mentioned Clogston application, each of the conducting layers 13 and 16 is very thin compared to the skin depth $\delta$ (Equation 1) of the conductor being used which, for example, can be copper, silver or aluminum. The layers of magnetic insulating material 14 and 17 likewise are made very thin and may be of any suitable material, an example of a satisfactory material being a ferrite. (Ferrites and their properties are described in an article entitled "Ferrites: New magnetic materials for communication engineering," by V. E. Legg in the May 1951 number of the Bell Laboratories Record at page 203.) The inner conductor 12 has 10 or 100 or even many thousand conducting layers 13 and the outer conductor 15 has a somewhat similar number of conducting layers 16, although there need not be the same number of conductors as in the inner conductor 12. Since there are a large number of insulating or conducting layers, it makes no difference whether the first or the last layer in each stack (12 or 15) is of conducting or of insulating material.

The particular advantage of using magnetic laminae is that they raise the intrinsic impedance of the stack. Thus, if the stack fills at least a substantial fraction of the region through which the wave is traveling, the impedance of the system is increased and the loss is reduced. Assume that the structure is laminated as in Figs. 1 and 2 and that the thickness of each of the magnetic insulating laminae is $t$ meters, their dielectric constant is $\epsilon_2$ farads per meter, and their permeability is $\mu$ henries per meter, and that the thickness of each of the conducting laminae is $W$ meters, and their conductivity is $\sigma$ mhos per meter. As the laminae in the structure of Figs. 1 and 2 do not completely fill the region of transmission the remaining space is filled with insulator of average dielectric constant $\bar{\epsilon}_1$ and average permeability $\bar{\mu}_1$ given by the expression $$\bar{\mu}_1 \bar{\epsilon}_1 = \epsilon_2 \left( \mu + \frac{W}{t} \mu_0 \right) \frac{\text{farads}}{\text{meter}} \quad (3)$$

where $\mu_0$ is the permeability of free space in henries per meter. By proper selection, that is in accordance with Equation 3, of insulator 18 which may or may not be magnetic, the velocity of propagation of the electromagnetic wave along the conductor is made appropriate to the average transverse dielectric constant of the composite conductors multiplied by their average permeability. Under these conditions, the currents of the electromagnetic wave itself penetrate deeply within the composite conductor, thus greatly reducing the skin effect losses and producing a favorable current distribution. In the structure of Figs. 1 and 2, the permeability is much greater than in the corresponding structure in the Clogston application and since the power propagated through the system is proportional to the square of the total magnetic flux which in turn is proportional to the permeability times the current density (the factors of proportionality being geometric in nature), then an increase in the permeability will decrease the current density required to propagate a given power providing the geometrical factors are not changed.

In the arrangement of Figs. 1 and 2, special means as above described have been provided to assure the proper velocity of propagation of the electromagnetic wave along the system. Within the conductor the wave has an intrinsic velocity of propagation just appropriate to the product of the average transverse dielectric constant and average permeability. Thus, if the region within which the electromagnetic wave is propagated is completely filled with the composite conductor, the condition on the velocities is automatically fulfilled. Figs. 3 and 4 illustrate a coaxial transmission line 20 constructed in accordance with this principle (as is also the arrangement of Fig. 17A in the above-identified Clogston application).

In the arrangement of Figs. 3 and 4, the entire region between the sheath 21 and the core 22 (which may be either of solid tubular metal, either magnetic or non-magnetic, or of dielectric material) is filled with alternate laminae of conducting material 23 and magnetic insulating material 24, respectively. Each conducting lamina, as in the arrangement of Figs. 1 and 2, is made as thin as possible compared with the skin depth $\delta$ as given by Equation 1. The magnetic insulating laminations are also made very thin; for example, in many cases it is preferable to make them thinner than the conducting laminations. The material of the laminations 23 and 24 can be similar to that of the corresponding laminations in the stacks 12 and 15.

Figure 6:
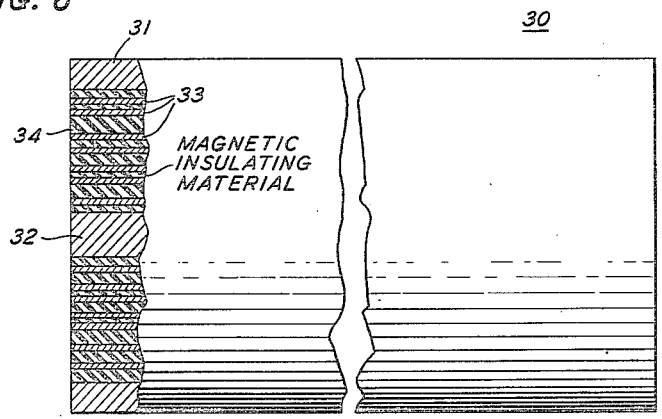
Fig. 6 is a longitudinal view, with portions broken away, of the arrangement of Fig. 5.

Figs. 5 and 6 illustrate a third embodiment of the invention, Fig. 5 being an end view and Fig. 6 being a longitudinal view. The composite conductor 30 shown in these figures comprises an outer shield 31 of any suitable shielding material, an inner core 32 of conducting material, either magnetic or non-magnetic, or of dielectric material, and a space therebetween filled with a multiplicity of filaments 33 of conducting material separated by magnetic insulating material 34. Each of the filaments 33 has a cross-section which, as in the laminated structures described above, is small compared with the factor $\delta$ which is defined by Equation 1. The members 33 may be copper, silver or aluminum, for example, while the insulating material 34 may be, for example, a ferrite. The filaments 33 maintain the same relative cross-sectional or radial position along the composite conductor 30; that is, there is no necessity to transpose them in order to produce the current or field distribution desired. As in the preceding structures, the effect of making the insulating elements of magnetic material is to increase the permeability of the composite structure, thereby raising the impedance and reducing the attenuation.

Figure 7:
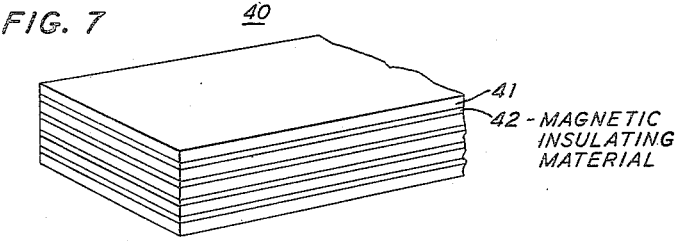
Fig. 7 is a perspective view of a "stack" in accordance with the invention formed of alternate layers of magnetic conducting material and magnetic insulating material.

In Fig. 7 there is shown in perspective a laminated conductor 40 comprising a stack of alternately disposed conducting layers 41 and magnetic insulating layers 42 which may be of the same materials as the corresponding elements in the structure shown in Figs. 3 and 4 above. The similarity of this stack to the structure shown in Fig. 2A of the above-identified Clogston application will be readily apparent with the insulating elements of the latter represented by magnetic material in the present invention.

It should be readily apparent that the invention is not restricted to the specific forms of composite conductors shown, as the invention is obviously applicable to other elements disclosed in the above mentioned Clogston application; and, moreover, many other modifications of the embodiments disclosed can be made without departing from the scope of the invention as indicated in the claims.

What is claimed is:

1. In an electromagnetic wave guiding system, a conducting medium comprising a multiplicity of elongated conducting portions spaced by means including magnetic insulating material, and means for launching high frequency electromagnetic waves in said system, the conducting portions and magnetic insulating material being in the form of laminations alternately of non-magnetic conducting and magnetic insulating materials, there being a sufficient number of conducting portions to carry a substantial portion of the current induced by said waves, and each of said conducting laminations having at least one dimension in a direction substantially transverse to the direction of wave propagation down the length thereof which is small compared with its appropriate skin depth at the highest frequency of operation with said high frequency waves, whereby the said conducting medium is substantially penetrated by the electric field of said waves.

2. In an electromagnetic wave guiding system comprising an inner core member and an outer shell coaxially arranged therewith, a conducting medium between the core and the shell, said conducting medium comprising a multiplicity of laminations alternately of non-magnetic conducting and magnetic insulating materials, and means for launching high frequency electromagnetic waves in said system, there being a sufficient number of conducting laminations to carry a substantial portion of the current induced by said waves, and each of said conducting laminations having at least one dimension in a direction substantially transverse to the direction of wave propagation down the length thereof which is small compared with its appropriate skin depth at the highest frequency of operation with said high frequency waves, whereby the said conducting medium is substantially penetrated by the electric field of said waves.

3. The combination of elements as claimed in claim 2 in which said non-magnetic conducting and magnetic insulating laminations are arranged in the form of two stacks separated by an insulating member.

4. The combination of elements as claimed in claim 3 in which said stacks are coaxially arranged with respect to each other and said inner core and said outer shell.

References Cited in the file of this patent

UNITED STATES PATENTS

| | | |
|---|---|---|
| 1,701,278 | Silbermann | Feb. 5, 1929 |
| 1,903,975 | Buckley | Apr. 18, 1933 |
| 2,228,798 | Wassermann | Jan. 14, 1941 |
| 2,433,181 | White | Dec. 23, 1947 |
| 2,511,610 | Wheeler | June 13, 1950 |
| 2,777,896 | Black | Jan. 15, 1957 |

FOREIGN PATENTS

| | | |
|---|---|---|
| 458,505 | Great Britain | Dec. 17, 1936 |